No. 795,766. PATENTED JULY 25, 1905.
T. GRAY.
POSTAL SCALE.
APPLICATION FILED JULY 1, 1904.
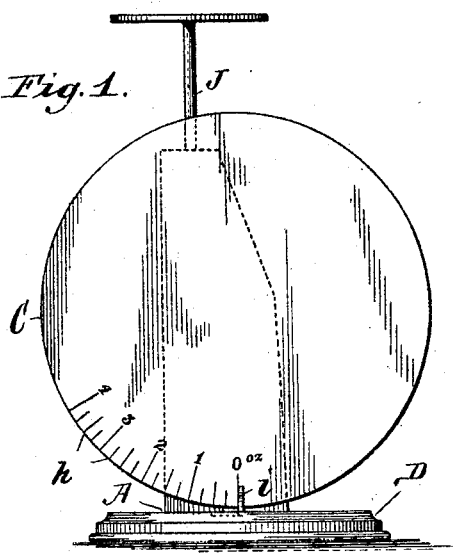
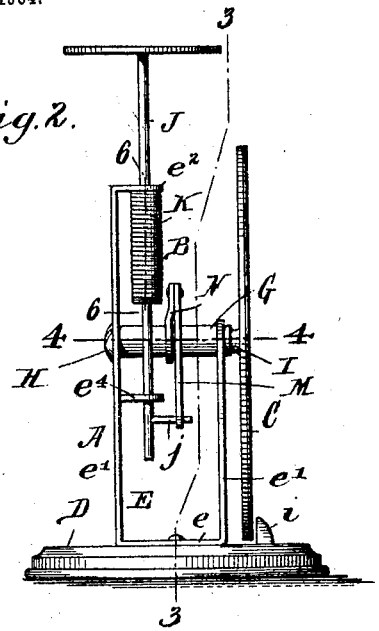
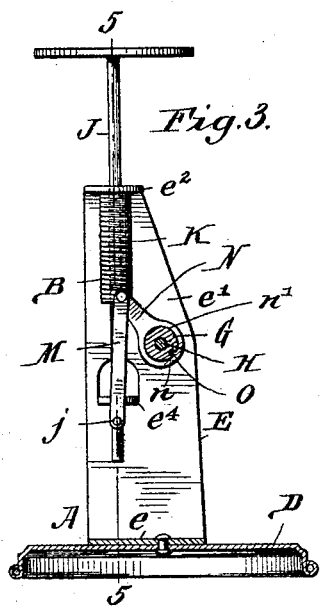
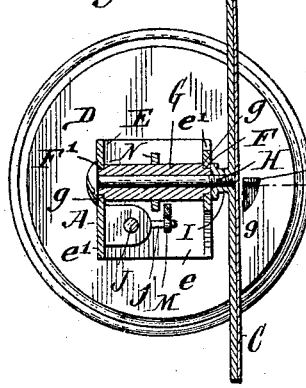
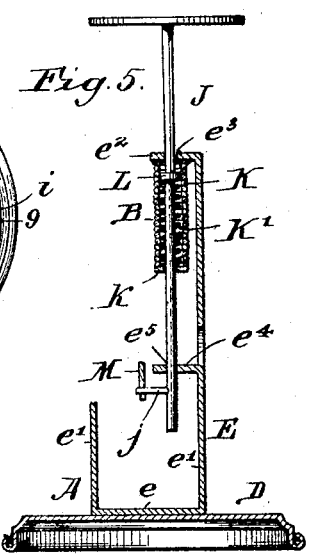
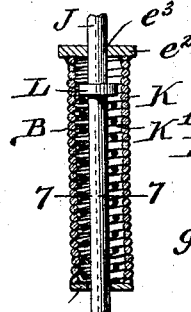
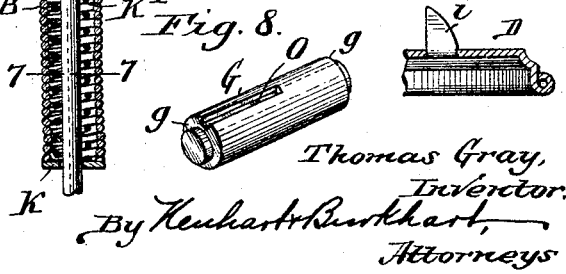
Witnesses:
B. Mason
Edwin Maier
Thomas Gray,
Inventor.
By Kenhart & Burkhart,
Attorneys.

UNITED STATES PATENT OFFICE.

THOMAS GRAY, OF BUFFALO, NEW YORK.

POSTAL SCALE.

No. 795,766.   Specification of Letters Patent.   Patented July 25, 1905.

Application filed July 1, 1904. Serial No. 214,880.

*To all whom it may concern:*

Be it known that I, THOMAS GRAY, a citizen of the Dominion of Canada, residing at Buffalo, in the county of Erie and State of New York, have invented certain new and useful Improvements in Postal Scales, of which the following is a specification.

My invention relates to postal scales; and the primary object thereof is the production of a scale which can be cheaply constructed, so that it may be given away as an advertising device, it being so constructed that it will weigh letters and small packages as accurately as a high-priced scale.

Other objects are to provide a scale in which the weight-graduated disk is made revoluble and the indicating-finger stationary, so as not to obstruct the face of the disk, which is intended for advertising purposes, and to provide two springs which are arranged so that one spring will come into action before the other during the initial movement of the disk, the resisting force of the spring coming into action first being fully taken up during the initial action of the other spring. The last-mentioned spring having the greater resisting power, a letter or package of very light weight would not bring it into action to accurately weigh the same, and for this reason the auxiliary spring must be depended on for weighing packages of light weight.

To these ends the invention consists in the construction, arrangement, and combination of parts to be hereinafter described, and particularly pointed out in the appended claims.

In the drawings, Figure 1 is a front elevation of my improved scale. Fig. 2 is a side elevation of the same. Fig. 3 is a vertical section taken on line 3 3, Fig. 2. Fig. 4 is a horizontal section taken on line 4 4, Fig. 2. Fig. 5 is a vertical section taken on line 5 5, Fig. 3, the weight-graduated disk and the front member of the standard being omitted. Fig. 6 is an enlarged vertical section taken on line 6 6, Fig. 2. Fig. 7 is a cross-section taken on line 7 7, Fig. 6. Fig. 8 is a detached perspective view of the revoluble sleeve supported in the uprights. Fig. 9 is an enlarged vertical section through a portion of the base, taken on line 9 9, Fig. 4, the parts above the base being omitted.

Referring to the drawings in detail, like letters of reference refer to like parts in the several figures.

The reference-letter A designates the support, B the weighing mechanism, and C the indicating-disk.

The support may be constructed in any suitable manner, but as shown herein comprises a base D and a standard E, formed in one piece and having a bottom cross-piece $e$, secured to the base by riveting or otherwise, and two standards or uprights $e'$, one of which is longer than the other. The rear upright is bent at a right angle at its upper end, as at $e^2$, to form a guide which is provided with an opening $e^3$, and the said upright is provided with a second guide $e^4$, which is stamped from the metal and bent at a right angle, it being also provided with an opening $e^5$, both openings in the guides being alined. The upper end of the front standard is provided with an opening F, and in line therewith an opening F' is formed in the rear upright.

G designates a revoluble sleeve or hollow shaft having its ends reduced to form shoulders $g$, said reduced ends entering the openings F F' in the uprights with the shoulders of the sleeve bearing against the inner opposing faces of the latter. Passing through the said shaft and projecting with its threaded end from the front end of the same is a screw H, onto the projecting end of which the weight-indicating disk C is screwed. This disk is by preference provided with a central boss I, which is internally threaded to receive the screw H, and it is further provided with weight-indicating graduations $h$, arranged at the marginal portion thereof through an arc of a circle, the graduated region being in proportion to the extent of revolution of said disk.

Stamped from the base D is a vertically-disposed stationary indicating-finger $i$, and the disk C is held in such relation to the said finger that normally the zero-mark of the graduations is held in line therewith, this being accomplished by the weighing mechanism, which will now be described.

J designates a vertically-movable rod which is guided in its movements by the perforated guides $e^2$ $e^4$, through which it passes, and at its upper end is secured a disk or scale-pan, on which the matter to be weighed is laid. The said rod is normally held elevated by spiral springs K K', through which it passes, the spring K being secured at its upper end to the upper guide $e^2$ of the support and having its lower end closed in any suitable manner; but as herein shown it is closed by an apertured disk $k$, soldered to the lower end of the spring, the rod J being free to move in said disk. The spring K is a retractile or expansion spring, and the spring K', which is a compression-spring, is located within the spring K and bears with its upper end against a collar L, secured to the rod J, and with its lower end against the closed end of the spring K. The latter is made of heavier and stiffer material than the spring K', and the comparative resistance is such that the compression-spring is brought into action first, it being designed to accurately weigh letters and packages of light weight. In weighing heavier packages the resistance of the compression-spring is first overcome, after which the actual weight is determined by the retractile spring, the latter only coming into action as the resisting force of the compression-spring is about taken up.

The lower end of the rod J is adapted to come in contact with the cross-piece $e$ of the support when an article of greater weight than the capacity of the scale is laid thereon, thus preventing straining of the springs and maintaining the same in proper condition at all times. Near the lower end of said rod a laterally-projecting pin $j$ is provided which has connection with the lower end of a link M, the upper end of which latter is pivotally connected to a rock-arm N, secured to the shaft G. The latter is provided with a longitudinal groove O, into which a projecting pin $n$ fits, that projects into the opening $n'$ in the said rock-arm.

The downward movement of the rod J draws the rock-arm N down and causes the sleeve and the weight-indicating disk to revolve in proportion to the resistance exerted against the spring by the article being weighed.

This invention is susceptible to changes in construction, form, and arrangement of parts, and I do not wish to confine myself to the construction herein shown, but hold myself at liberty to make such changes as fairly fall within the scope of my invention, limited only by the appended claims, construed according to the prior art.

Having thus described my invention, what I claim is—

1. In a weighing-scale, the combination with a support, of a revoluble shaft journaled in said support, a weight-indicating disk connected to said shaft, a rock-arm secured to said shaft, a vertically-movable rod guided in the support and having a scale-pan at its upper end for the matter to be weighed, a spring surrounding said rod and having its upper end secured to the support and its lower end yieldingly connected to said rod so as to come into action only after the rod has started its downward movement, and a link connecting said rod with the rock-arm.

2. In a weighing-scale, the combination with a support, of a revoluble shaft journaled in said support, a weight-indicating disk connected to said shaft, a rock-arm secured to said shaft, a vertically-movable rod guided in the support and having a support at its upper end for the matter to be weighed, a retractile spring surrounding said rod and having its lower end closed, a collar on said rod, a compression-spring surrounding the rod within the retractile spring and bearing with one end against the closed end of the last-mentioned spring and with its other end against said collar, and a link connecting said vertically-movable rod with the said rock-arm.

3. In a weighing-scale, weighing mechanism comprising a movable rod having a collar, a retractile spring surrounding said rod and having one end thereof closed and its other end attached to a fixed point, and a compression-spring surrounding said rod within the retractile spring and bearing with its ends against the closed end of the retractile spring and the collar on said rod, respectively.

4. In a weighing-scale, the combination of a standard comprising two uprights, a lower cross-piece, and two guides extending from one of said uprights, a vertically-movable rod guided in said guides and having a scale-pan at its upper end for the matter to be weighed, a spring surrounding said rod and having its upper end secured to the standard and its lower end attached to said rod, a shaft journaled in the uprights of the standard, an arm secured to said shaft, a link connecting said arm with the vertically-movable rod, and a weight-indicating element affixed to said shaft.

5. In a weighing-scale, the combination of a standard formed of a single piece of sheet material and comprising two uprights connected by a lower cross-piece and two guides on one of said uprights, a vertically-movable rod guided in said guides and having a scale-pan at its upper end for the matter to be weighed, a spring surrounding said rod and having its upper end secured to the standard and its lower end attached to said rod, a shaft journaled in the uprights and having a longitudinal groove, an arm held on said shaft and having a projection entering said groove, a link connecting said arm with the vertically-movable rod, and a weight-indicating element affixed to said shaft.

6. In a weighing-scale, the combination with a support having two uprights, a hollow shaft having reduced ends which are journaled in said uprights, a screw-bolt passing through said shaft and having its threaded end projecting from said sleeve, a weight-denoting element secured to the threaded end of said screw-bolt, a vertically-movable rod guided on the support and having a scale-pan at its upper end for the matter to be weighed, a spring surrounding said rod and having one end secured to the support and its other end secured to said rod, an arm secured to the hollow shaft, and a link connecting said arm with the vertically-movable rod.

In testimony whereof I have affixed my signature in the presence of two subscribing witnesses.

THOMAS GRAY.

Witnesses:
    EMIL NEUHART,
    CHAS. F. BURKHART.